INVENTORS
CECIL A. CRAFTS
PERRY H. GOODWIN, JR.
BY
Browne, Schuyler & Beveridge
ATTORNEYS

FREQUENCY SHIFT DETECTION SYSTEM

Filed April 11, 1966 2 Sheets-Sheet 2

INVENTORS
CECIL A. CRAFTS
PERRY H. GOODWIN, JR.
BY Browne, Schuyler & Beveridge
ATTORNEYS United States Patent Office 3,474,341
Patented Oct. 21, 1969

3,474,341
FREQUENCY SHIFT DETECTION SYSTEM
Cecil A. Crafts, San Clemente, and Perry H. Goodwin, Jr., Dana Point, Calif., assignors to Robertshaw Controls Company, Richmond, Va., a corporation of Delaware
Filed Apr. 11, 1966, Ser. No. 541,776
Int. Cl. H04b 1/16
U.S. Cl. 325—320 9 Claims

ABSTRACT OF THE DISCLOSURE

This invention simplifies detection of binary data impressed upon a transmission wave as frequency modulations above and below a reference frequency. After squaring an incoming wave and differentiating to provide sharp axis-crossing signals of one sign these signals are first fed to the first of a cascaded pair of single shot multivibrators, producing adjacent like square waves of combined duration equal to the reference frequency period. This second square wave goes simultaneously to first terminals of two AND circuits, the second terminals of which receive in one case, the differentiated signal and, in the other case, an inversion thereof to produce one output when the first terminals and one spike are at positive potential and an opposite output when the first terminals and the other spike are at negative potential thereby to give opposite output pulses according to whether the incoming signal period is greater or less than the reference period.

This invention relates to a detection system for a frequency shift binary data communication system, and more particularly to simplified detector means for indicating which of a pair of transmitted signals is received.

It has previously been known to transmit and receive binary data by means of frequency shift keying (FSK) and to multiplex a number of subcarrier signals onto a signal carrier for transmission to a remote station where the subcarriers are separated by filtering to produce separate channels of digital information. It is also common practice to limit the filtered signal of one channel to remove extraneous amplitude modulation and to detect frequency shifts by various means, and to indicate the frequency deviations received in that channel. Previous methods of separating received frequencies have often been complex and expensive or have been difficult to adjust and maintain in proper operating condition, and have generally required considerable power and space for their operation.

One such prior art device for detecting keyed frequency shifts is disclosed in pending application Ser. No. 391,216, filed Aug. 21, 1964, by Cecil A. Crafts, one of the co-inventors hereof. That application concerned method and means for deriving binary information from a filtered channel of information employing three or more multivibrator devices in a wholly digital demodulation and detection system. There is a need in the communication art for simplified apparatus to perform the discrimination function more consistently and more reliably and with a minimum number of parts and adjustments to maintain maximum signal-to-noise ratio and freedom from jitter.

It is accordingly an object of this invention to provide a method and means for more simply detecting which of the two frequencies is instantly contained in a received FSK signal.

Another object of the invention is to provide a simplified method of detecting positive and negative deviations from a mean frequency to which the receiving channel may be tuned.

A further object of the invention is to detect frequency departures above or below a mean value using only two cascaded delay circuits feeding two adding circuits connected thereto responsive to oppositely poled enabling signals according to the direction of departure of the instant frequency from a passband control frequency.

A further object of the present invention is to provide a simpler detector for binary frequency modulations than has previously been available in high reliability communications work.

These and other objects of the invention will be more apparent upon consideration of the drawings in which.

The objects are achieved in this invention principally as follows: Input frequency limiting means such as a bandpass filter is followed by conventional amplitude limiting to provide sharply defined instants of axis-crossing of the voltage wave representing the selected channel frequency. According to previous well-known techniques, both a positive and a negative pulse may be derived from either a positive- or negative-going axis-crossing of the signal voltage. Such pulses are herein assumed to be differential spikes at the times of the positive-going axis-crossing signal. These timing pulses trigger a monostable multivibrator having a delay period or on-time approximating one-half the period of the center frequency for which the communication channel is attuned. Termination of this interval initiates a second interval within a second monostable multivibrator which produces an output of alternating polarity which is applied to the inputs for each of two gate circuits arranged, for example, to require two positive inputs in one case to provide an output signal, and two negative inputs to provide an output in the other case. The input to the first multivibrator feeds to one gating circuit while on inversion thereof feeds to the other, such that one gating circuit has output pulses when the output of the second multivibrator is positive and the other has an oppositely poled output when the output of the second multivibrator is negative. Under these circumstances, coincidence of positive input pulses causes output of one sign or magnitude whereas coincidence of negative inputs produces an opposite signal, and these two opposite signals are processed to produce waves corresponding to the digital information signal employed for modulating the subcarrier frequency at the transmitter. The positive and negative input spikes are taken each to only one of the gates.

Figure 1:
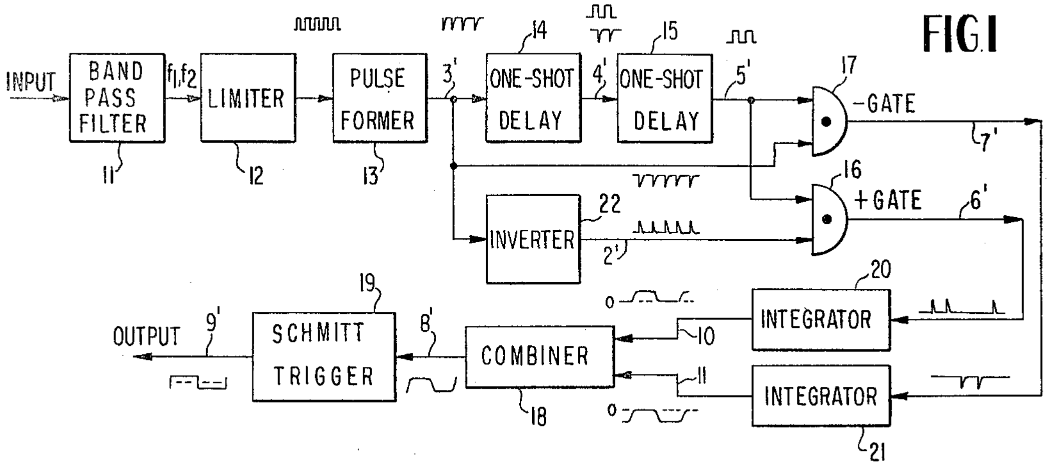
FIG. 1 is a block diagram of a system according to the present invention.

Considering the operation of the circuit more in detail, reference is first made to FIG. 1 where an input is indicated generally for bandpass filter 11 by which a frequency channel is segregated from other multiplexed frequencies, noise or other extraneous signals and produces an output consisting principally of a first and second frequency designated $f_1$ and $f_2$ between which this detector discriminates and indicates the result. A limiter 12 is of conventional design for the removal of various amplitude modulations and for the conversion of the generally sinusoidal input wave to squarewave modulations alternately of the two frequencies $f_1$ and $f_2$ as generally indicated in the waveform indications above the outputs in the block diagram.

The pulseforming circuit indicated at 13 may consist of a differentiating circuit and a clipping circuit for the purpose of removing either the positive-going excursions or the negative-going excursions of the differential spikes obtained by differentiating the output of the limiter 12. At 3' are illustrated negative spikes corresponding to the negative-going excursions in the output of the limiter, although convenience in triggering multivibrators might dictate that positive-going excursions be utilized. For the purpose of this invention, the sign of the pulse employed and the sign of the output are invertable without change in the concept, except that it is desired to produce opposite outputs from the gate circuits corresponding to frequency deviations above and below the mean frequency.

Figure 2:
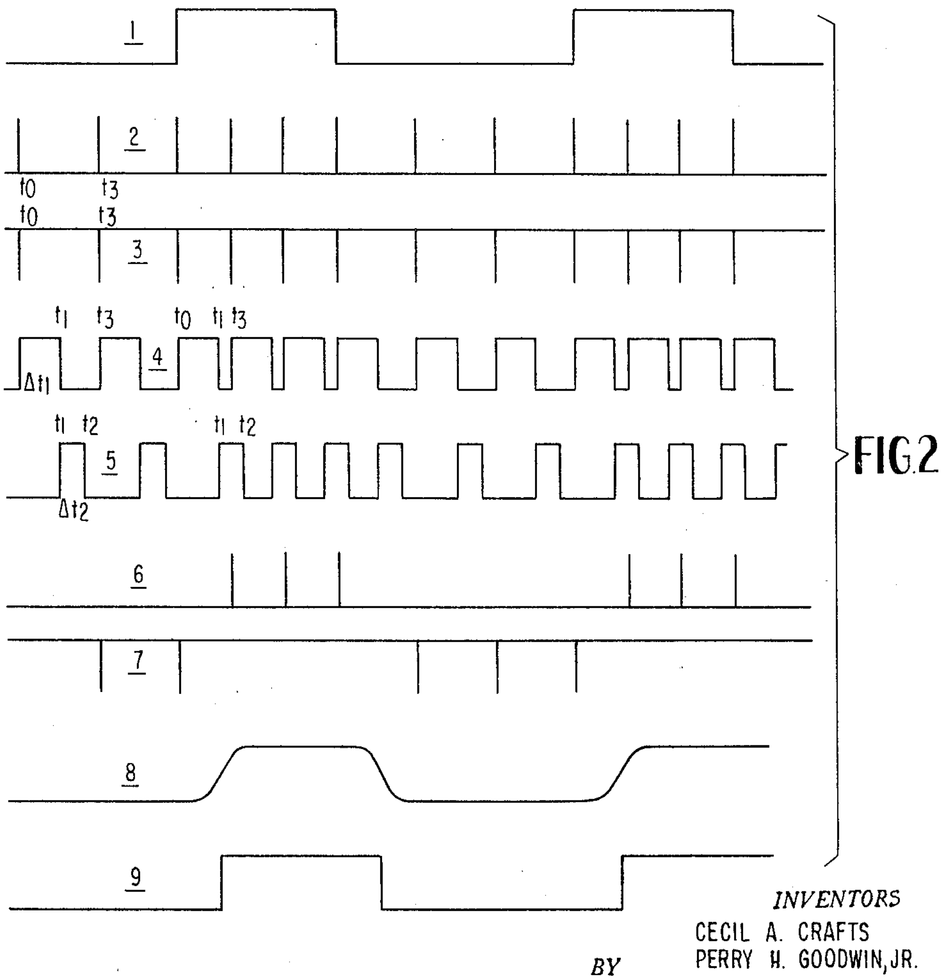
FIG. 2 illustrates typical waveforms produced at critical points within the apparatus of FIG. 1.

At 14 is illustrated a one-shot delay, otherwise known as a monostable multivibrator, here assumed to produce a positive output for a period of time following each negative input pulse, this period being ordinarily adjusted to about one-half the mean frequency between $f_1$ and $f_2$. This pulse is illustrated in FIG. 2 as commencing at $t_0$ and extending to $t_1$ over an interval there designated as $\Delta t_1$. While it may be assumed that $\Delta t_1$ would be one-half of the mean frequency of $f_1$ and $f_2$, it might be adjusted to one-half of the longer of the two periods involved if similar one-shot delay 15 connected thereto is adjusted to one-half the period of the higher of the two frequencies under consideration, to provide a total interval equal to the mean period. At 4 is illustrated an output from delay circuit 14, above which is represented a negative-going signal corresponding to the differentiated termination of the positive signal period. The output of delay circuit 15 is similar to that from 14 except that it commences at the termination of the signal from delay circuit 14, the important feature being that its period designated as interval $\Delta t_2$ extends from $t_1$ to $t_2$ to complete the period of the mean frequency between $t_1$ and $t_2$. The cumulative period comprising $\Delta t_1 + \Delta t_2$ need only be as precise as needed to distinguish between the mean frequency and either one of the frequencies $f_1$ or $f_2$.

An AND circuit 16 is of conventional design herein illustrated as corresponding to a positive input at each of two input terminals to provide a positive output period, a similar AND circuit or gate is illustrated at 17 connected to respond oppositely when and only when two input pulses of the opposite polarity are appplied to the gate inputs.

It will be noted that gates 16 and 17 are conventional AND gates, the difference between them being that one responds to two input signals of the same signs to produce an output signal of the selected sign, whereas the second gate responds to the opposite polarity of input signals to produce an output opposite in polarity to that of the first. It would, of course, be equivalent, to the extent convenient for practical purposes, to provide outputs of the same polarity as the inputs at each gate, or to give in one case a positive pulse responsive to a predetermined input set and a negative pulse from the other in response to the opposite pair of inputs. Opposite inputs to the two gates, when concurring as to sign, are shown to produce opposite outputs from the gates for processing at integrators 20 and 21, which combine output pulses of one sign into a fluctuating DC signal of a first sign from one integrator while producing a fluctuating DC level of opposite sign from the other integrator. It will be apparent that each integrator has a zero DC output while the other integrator has an output of its own characteristic polarity. When combined in combiner 18 two fluctuating DC signals at lines 10 and 11 become a single fluctuating DC signal passing through positive and negative excursions conveyed at line 8' to Schmitt trigger 19 to provide an output at 9' differing from the output from the combiner in that the rise times have been shortened to produce precise timing of mark and space intervals in the output signal.

In FIG. 2, line 1 represents a typical data signal modulating a carrier frequency in each of the data channels. Line 2 shows a typical result of passing the input signal through bandpass filter 11, limiter 12, and pulseformer 13, represented as positive spikes, while line 3 represents the inversions of line 2. Bandpass filter 11 is preferably tuned to a central frequency intermediately between $f_1$ and $f_2$ of which the period is represented in lines 2 and 3 as the interval $t_0$–$t_3$. Frequencies $f_1$ and $f_2$ are also passed and the filter cuts off sharply therebeyond. Limiter 12 performs the function of discarding substantially all of the amplitude variations so as to present an output which is a series of squarewaves at either of two frequencies.

Pulseformer 13 detects axis-crossings of a single direction which are formed into pulses, preferably of a very short duration. While either the positive-going or negative-going axis-crossings could be selected for display at line 2, and the opposite direction of axis-crossings could be detected and applied at line 3, such an arrangement would be ineffective for the purpose unless pulses of either line 2 or line 3 be shifted by one-half period, which would be inconvenient or impossible for the reason that two different periods are required for every channel. Instead, pulseformer 13 is arranged to have an output either as at 2 or at 3 and inverter 22 is connected to the output of pulseformer 13 for the purpose of inverting the pulses to provide positive pulses as in line 2 and simultaneous negative pulses in line 3.

Multivibrator 13 is preferably a solid state conventional single-shot monostable multivibrator, referred to as a delay circuit, which is triggered by pulses of line 3 to produce squarewave output pulses, shown positive, corresponding to approximately one-half the period of mean frequency received, and similar delay circuit 15 has output pulses which commence at the instant of signal delay in the squarewaves from 14 and continue until the termination of one period of the mean frequency to which the detector is adjusted. Illustrated at lines 4 and 5 of FIG. 2 are two specific examples of pulse width adjustments for delay circuits 14 and 15, in which circuit 14 provides a period of about one-half that of the lower frequency being received, whereas, circuit 15 provides the balance of the period of the mean frequency $$f_1 + f_2/2$$

These partial periods provided at 14 and 15 are designated at $\Delta t_1$ and $\Delta t_2$. It will be apparent that $\Delta t_1$ may be shortened and $\Delta t_2$ may be lengthened as may be found convenient to provide a total period approaching that of the mean frequency, within the desired limits of adjustments, but once selected, remain constant during operation. As illustrated, $\Delta t_1$ commences at $t_0$ and terminates at $t_1$, but is again triggered at $t_3$ as the next axis-crossing is indicated for the frequency then being received, and $\Delta t_2$ commences at $t_1$ and extends to $t_2$ so that $\Delta t_1 + \Delta t_2$ corresponds to the period of the mean frequency.

During operation, reduced and increased frequencies are to be distinguished. When an increased frequency is received, the period between $t_1$ and $t_3$ is shortened thereby to cause a change in the time of occurrence of spikes in lines 2 and 3 relative to the constant time of $\Delta t_1 + \Delta t_2$ so that a spike at $t_3$ occurs before or after termination of $\Delta t_1 + \Delta t_2$. Whenever the squarewave output from circuit 15 drops to zero it remains in this condition until the termination of the next square pulse from circuit 14. It will now be apparent that either the pulses of line 2 or the pulses of line 3 may be employed to initiate a period $\Delta t_1$, depending upon the delay circuitry. As illustrated, circuits 14 and 15 are both effective to initiate a positive output square pulse at the instant of an input negative spike, and circuit 15 is initiated at the negative-going trailing edge of the positive pulse from circuit 14. It may be seen that pulses in line 2 will be coincident with squarewaves from circuit 15, assuming both these outputs to be positive, for every cycle of incoming frequency which is of period less than $\Delta t_1 + \Delta t_2$. Whenever the period of an instantly received wave is less than $\Delta t_1+\Delta t_2$ it will be evident that negative pulses of line 3 correspond to negative values of the signal in line 5. Assuming that AND gates 16 and 17 are connected to produce output pulses of the same sign as the input pulses thereto, lines 6 and 7 will show a series of positive polarity pulses for each frequency above the mean frequency and a series of negative pulses for an input frequency below that of a mean frequency as measured by the sum of the delays in circuits 14 and 15.

Integration of pulses in lines 6 and 7 occurs in integrators 20 and 21. Integrated pulses obtained from lines 6 and 7 would not combine exactly to show the signal of line 8 in FIG. 2 for the reason that the pulses illustrated at 6 and 7 are idealized. But a few pulses are shown in each case, whereas in practice would comprise a much larger number of pulses for combining to approximately the signal in line 8. A circuit such as the Schmitt trigger illustrated at 19 is normally adjusted to respond at approximately the axis-crossing time of input signal thereto to produce positive and negative output squarewaves thereby serving as a wave-shaping circuit. In line 9 of FIG. 2 is illustrated such an output signal corresponding to the input signal of line 1, except for a delay of approximately one-half period of the incoming wave.

An important feature of the present invention is the minimum delay between the input of a mark or space signal and the production of a corresponding output signal of the same kind. Here a set of pulses derived directly from the received wave are combined with a timed delay signal with only an inversion of the pulses of line 2 before use in the adding circuit. Signal jitter is thereby reduced to a low value by the direct comparison provided. It will be evident that introduction of additional circuitry such as delay circuits or further pulse forming operations, or feeding through additional logic, will result in increased jitter or dependence upon the accuracy with which frequencies $f_1$ and $f_2$ are represented in the output from the delay circuits.

Figure 3:
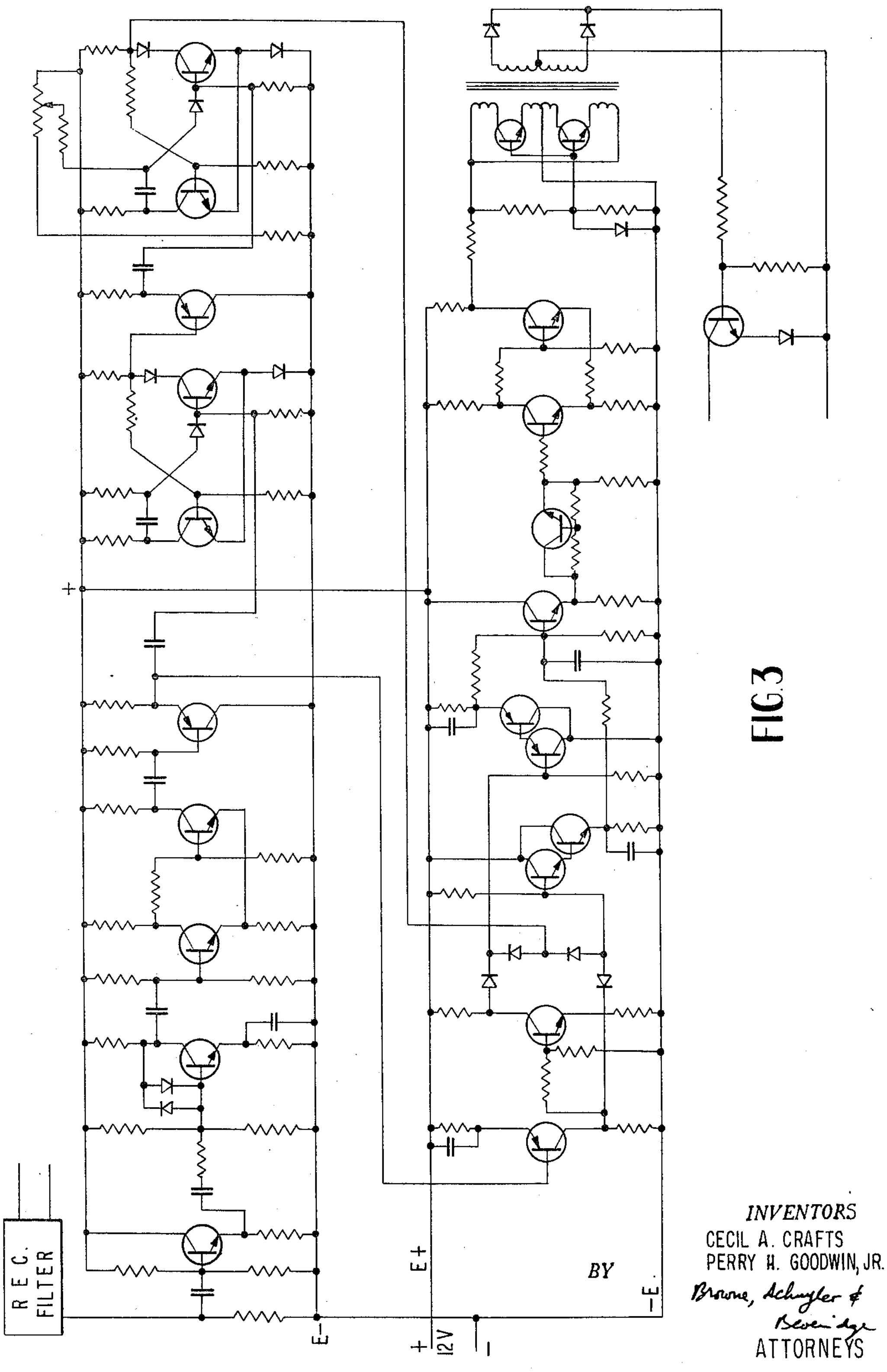
FIG. 3 is a schematic circuit diagram of a practical embodiment of a system according to the present invention.

FIG. 3 illustrates one practical embodiment of a circuit providing functions according to FIG. 1, employing solid-state circuitry. Other embodiments are, of course, possible in a detector as herein disclosed to produce a high reliability of output signal corresponding precisely to the input signal, noise, and jitter often experienced in digital and non-digital frequency detection devices being herein minimized by the simplified structure and by providing an output data signal very closely in synchronism with the modulation signal, lag being limited to approximately a half-cycle of carrier. It will be noted that the circuitry of FIG. 3 corresponds to the block diagram of FIG. 1 and provides processing as illustrated in FIG. 2, the circuit components being illustrated in a manner readily understood by those skilled in the art pertinent to solid-state processing of digital signals, in view of the descriptions herein provided.

While the invention has been described in connection with a particular embodiment, it will be understood that it may be otherwise practiced without departing from the scope of the invention as set forth in the following claims.

What is claimed is:

1. In a detector for reproducing a binary signal employed to modulate a communication wave for producing a frequency above and a frequency below a mean frequency according to said signal, receiver means producing first pulses timed to correspond with axis-crossing times for said wave in each of said frequencies, means producing second like-timed pulses of a sign opposite first said pulses, first time delay means for providing a pulse approximately midway between successive pairs of said pulses, second time delay means for providing a gating pulse of predetermined character and fixed duration extending from each last-named pulse to the end of a period terminating at the axis-crossing time corresponding substantially to that of said means frequency, and of different character during the remainder of each period of the received wave, first means comparing the coincidence said first pulses with pulses of said predetermined character to indicate one said frequency, second means comparing for coincidence said second pulses with pulses of said different character to indicate the other said frequency, and means combining like said indicated coincidences cumulatively to indicate receipt of a frequency above said means over a time interval corresponding to the duration of said frequency transmission in one state thereof.

2. In a detector according to claim 1, said means for indicating coincidence comprising AND circuitry responsive to inputs of predetermined polarity to produce outputs of opposite sign for received waves of frequency above and below said mean.

3. In a detector according to claim 1, said means combining like coincidences comprising signal storage means effective over a time corresponding to positive and negative portions of said binary signal.

4. In a detector according to claim 1, said first time delay means comprising a monostable multivibrator having a period substantially half the period of one said frequency and said second time delay means comprising a monostable multivibrator having a period substantially half the period of the other said frequency.

5. In a detector according to claim 1, said means combining coincidences comprising integrating means individual to each said comparing means and means combining signals in said integrating means to form a squarewave output having positive and negative sign according to deviation of said received frequency above or below said mean.

6. A detector for binary data transmitted as alternative frequencies of AC wave energy, comprising receiver means generating signal spikes at the successive axis-crossing times of the wave transmitted at each instant, means generating second signal spikes opposite in sign and coincident with first said spikes, multivibrator means for establishing a first fixed period following each occurrence of signal spikes, second multivibrator means for establishing a second fixed period following each first period and extending beyond the next generated spikes of one transmitted frequency when occurring, and terminating before said next generated spikes of the alternatively transmitted frequency when occurring, means controlled by said second multivibrator for producing a gating signal during each said second period and a different signal therefollowing, gate means for combining only said spikes of one sign with said gating signal to produce a first output signal, upon concurrence, and second gate means for combining only said spikes of opposite sign with said different signal to produce a second output upon concurrence thereof.

7. A detector according to claim 6 wherein first said means for combining produces an output spike of one polarity whenever a spike of said one sign concurs with said gating signal, second said means for combining produces an output pulse of opposed polarity whenever a spike of opposite sign concurs with said different signal, and output pulses of each sign occurring adjacently over an interval are integrated to provide composite output signals of opposite polarity for intervals of transmission of alternatively transmitted frequencies, as a binary data output.

8. In a detector for resolving a pair of frequencies transmitted as FSK bits, receiver means generating axis-crossing pulses of one sign timed according to axis-crossing time variations of the instantly transmitted wave, first multivibrator means having a first fixed period initiated by each said pulse, second multivibrator means responsive to said first means for generating a positive signal measuring a second fixed period immediately following each said first period and terminating prior to the next generated pulse for one said frequency of transmitted wave and terminating after said next pulse for the other frequency of said pair, means generating inverted pulses coincident with first said pulses, means including two AND circuits for combining a said pulse of one sign or a said inverted pulse with a like polarity signal from said second generator depending on whether the period ends before and after said next generated pulse, and means indicating received frequency as a function of the occurrence of said next pulse during or after said second period.

9. In a detector according to claim 8, said pulses and inverted pulses being in substantial synchronism with axis-crossing time of the wave for the frequency instantly transmitted.

References Cited

UNITED STATES PATENTS 3,233,181 2/1966 Clafee ------------- 178—66 X

ROBERT L. GRIFFIN, Primary Examiner

W. S. FROMMER, Assistant Examiner

U.S. Cl. X.R.

178—66; 328—140; 329—128